United States Patent

Ross et al.

[11] Patent Number: 6,149,568
[45] Date of Patent: Nov. 21, 2000

[54] METHOD OF FOLDING AN AIRBAG FOR A VEHICLE SAFETY RESTRAINT

[75] Inventors: Hubert Rene Ross, Oberursel; Udo Bonsch, Neu-Isenburg, both of Germany

[73] Assignee: Breed Automotive Technology, Inc., Lakeland, Fla.

[21] Appl. No.: 09/308,416

[22] PCT Filed: Nov. 24, 1997

[86] PCT No.: PCT/GB97/03219

§ 371 Date: May 18, 1999

§ 102(e) Date: May 18, 1999

[87] PCT Pub. No.: WO98/23468

PCT Pub. Date: Jun. 4, 1998

[30] Foreign Application Priority Data

Nov. 26, 1996 [DE] Germany .............................. 96 24 624

[51] Int. Cl.[7] ...................................................... B31B 1/26
[52] U.S. Cl. .......................... 493/458; 493/405; 493/406
[58] Field of Search ..................................... 493/458, 457, 493/451, 456, 455, 454, 941, 405, 406, 407, 409, 408; 280/728.1

[56] References Cited

U.S. PATENT DOCUMENTS

| | | | |
|---|---|---|---|
| 1,708,534 | 4/1929 | Christman, Jr. .......................... | 493/457 |
| 3,571,812 | 3/1971 | Speevak et al. .......................... | 493/407 |
| 5,398,968 | 3/1995 | Emanbakhsh et al. ............. | 280/743 R |
| 5,482,317 | 1/1996 | Nelsen et al. .......................... | 493/728.1 |
| 5,607,182 | 3/1997 | Nelsen et al. .......................... | 280/728.1 |
| 5,615,915 | 4/1997 | Magotenaux .......................... | 280/743.1 |
| 5,794,974 | 8/1998 | Niederman et al. .................. | 280/728.1 |
| 5,848,805 | 12/1998 | Sogi et al. ............................. | 280/728.1 |
| 5,884,939 | 3/1999 | Yamaji et al. ....................... | 280/728.1 |
| 5,944,344 | 8/1999 | Yoshioka et al. .................... | 280/728.1 |

FOREIGN PATENT DOCUMENTS

DT25 36 933
A1   3/1976   Germany .

*Primary Examiner*—Stephen F. Gerrity
*Assistant Examiner*—Sam Tawfik
*Attorney, Agent, or Firm*—Mark Seitzman

[57] ABSTRACT

An airbag (1) for a vehicle safety restraint and particularly a method of folding an airbag comprising laying the airbag (1) generally flat, making folds in the flat airbag to form a polygon (such as a square) in plan view, folding all of the sides of the polygon upwardly and inwardly of the polygon considered in plan view so that at least one point on each side meets a point on at least one other side at a position generally above the centre of the polygon so that the corners of the polygon form upstanding ears (7), and subsequently rolling (E) the upstanding corner ears of the polygon to form the airbag into a cylindrical shape. An airbag folded in this way is very compact and will fit into a housing of smaller diameter than was hitherto possible. The invention applies particularly to a driver's side airbag.

11 Claims, 4 Drawing Sheets

METHOD OF FOLDING AN AIRBAG FOR A VEHICLE SAFETY RESTRAINT

BACKGROUND AND SUMMARY OF THE INVENTION

The present invention relates to an airbag for a vehicle safety restraint and particularly to a method of folding a uninflated airbag for storage in the vehicle. The method applies primarily to a driver's side airbag but can easily be adapted to a passenger side bag, to a side impact bag or to other forms of airbag.

Airbags are relatively bulky accessories and there is a desire to minimise the space occupied by the folded bag in the vehicle. This is particularly true of a driver's side airbag which is usually housed in the hub of a steering wheel and thus must fit into a very small space, particularly in the smaller steering wheels used in sport model vehicles or other customised designs. Traditionally an uninflated airbag is folded in consecutive overlapping folds until it occupies the requisite space. Often pressure and sometimes heat is applied to compact it further.

The present invention aims to provide a method by which an airbag can be folded into a smaller diameter housing giving a more compact module than is possible with traditional methods.

According to the present invention there is provided a method of folding an airbag comprising laying the airbag generally flat, making folds in the flat airbag to form a polygon in plan view, folding all of the sides of the polygon upwardly and inwardly of the polygon considered in plan view so that at least one point on each side meets a point on at least one other side at a position generally above the centre of the polygon so that the corners of the polygon form upstanding ears, and subsequently rolling the upstanding corner ears of the polygon to form the airbag into a cylindrical shape.

According to a preferred embodiment of symmetry or relative to lines of symmetry of the first formed polygon, for example lying at 45° and less to respectively the first and second lines a method is provided of folding an airbag wherein the step of making folds in the flat airbag comprises the airbag folding subsequently folding the airbag along parallel lines spaced equidistantly on opposite sides of a line of symmetry, perpendicular to the first line of symmetry. These folding steps may be repeated to form a smaller polygon. The further folding may be relative to the same lines of symmetry or relative to lines of symmetry of the first formed polygon, for example lying at 45° and less to respectively the first and second lines.

According to a preferred embodiment a method is provided wherein the corner turning or bending step is accompanied or preceded by a step of stretching the corner ears in a radially outward direction, and/or of flattening the corner ears by applying force at opposite sides of each ear, particularly at those parts of the corner ears which bulge or arch outwardly.

For a better understanding of the present invention and to show how the same may be carried into effect, reference will now be made to the accompanying drawings in which:

DETAILED DESCRIPTION OF THE DRAWINGS

In each Figure an airbag 1 is shown schematically in plan view. The airbag 1 is a driver's side airbag and is circular in plan view in the uninflated state.

The airbag 1 comprises two circles of airbag fabric which are stitched or welded together around their periphery to form a hollow cushion. A gap may be left in the stitching for the inflation inlet, or alternatively a hole is more usually formed toward the centre of one of the circular fabric pieces.

Figure 1:
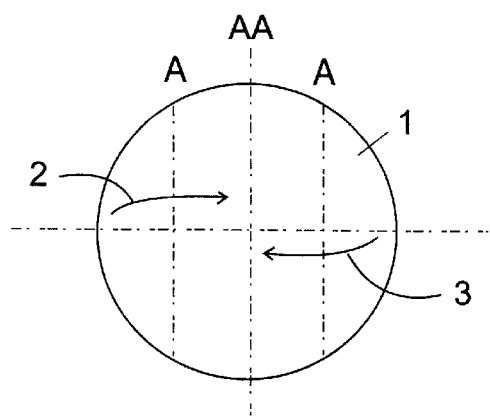
FIGS. 1 to 9 comprise a sequence of steps of a method of folding an airbag according to the invention.
Figure 2:
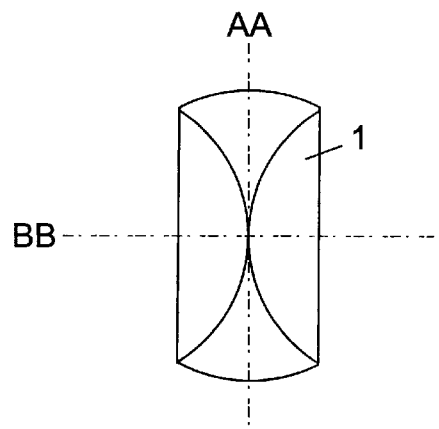

The first folding step is shown in FIG. 1 and comprises folding the bag 1 along lines A so that opposing outer edges are brought together at the centre line AA. This is indicated by arrows 2 and 3 respectively, and forms the oblong shape shown in FIG. 2. The edges may overlap or be separated by a gap, or abut each other at the line AA. The exact arrangement depends upon the diameter-height ratio of the housing into which the airbag is to be fitted. For example for a shallow housing of large diameter the edges should preferably overlap whereas for a deep housing of smaller diameter they should be separated so that there is only one layer of fabric at the centre.

Figure 3:
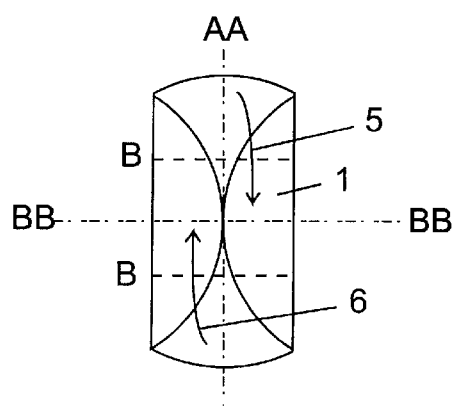
Figure 4:
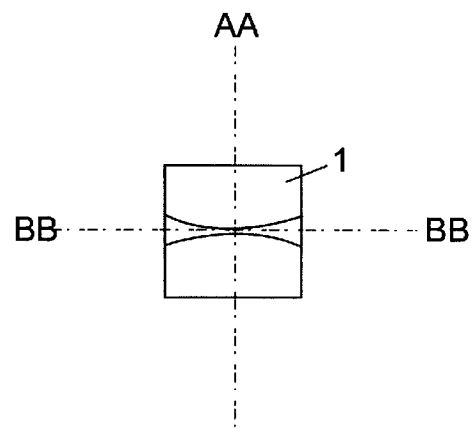

The shape thus formed is folded again as indicated in FIG. 3 along each of lines B. Lines B are perpendicular to lines A and are equispaced about centre line BB. This forms a regular polygon in the form of a square as shown in FIG. 4.

Figure 5:
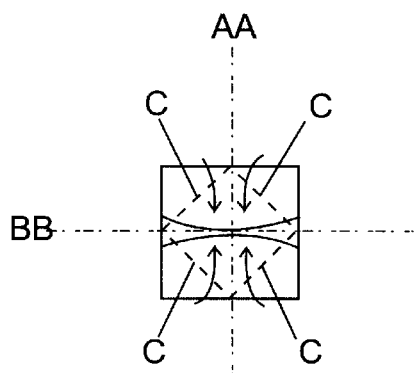
Figure 6:
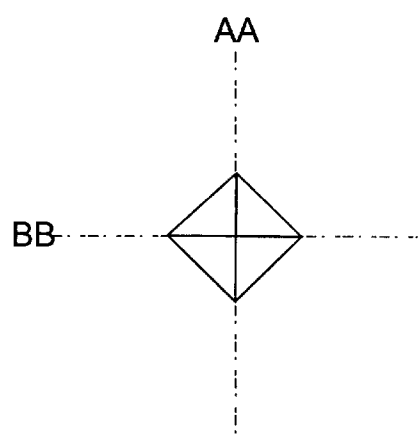

The corners of the square thus formed are folded in again this time along lines C, as indicated in FIG. 5 to form a smaller square as shown in FIG. 6.

Figure 7:
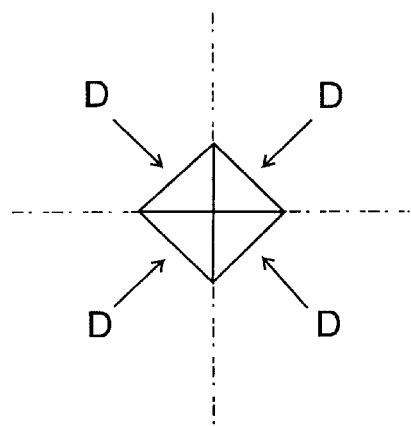
Figure 8:
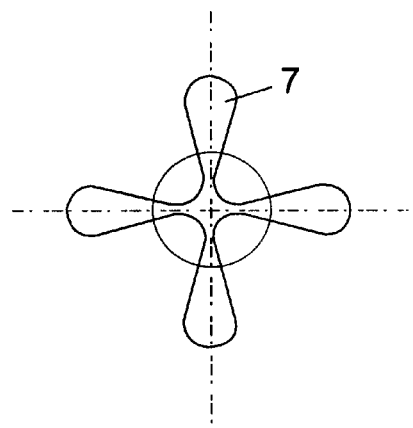
Figure 10:
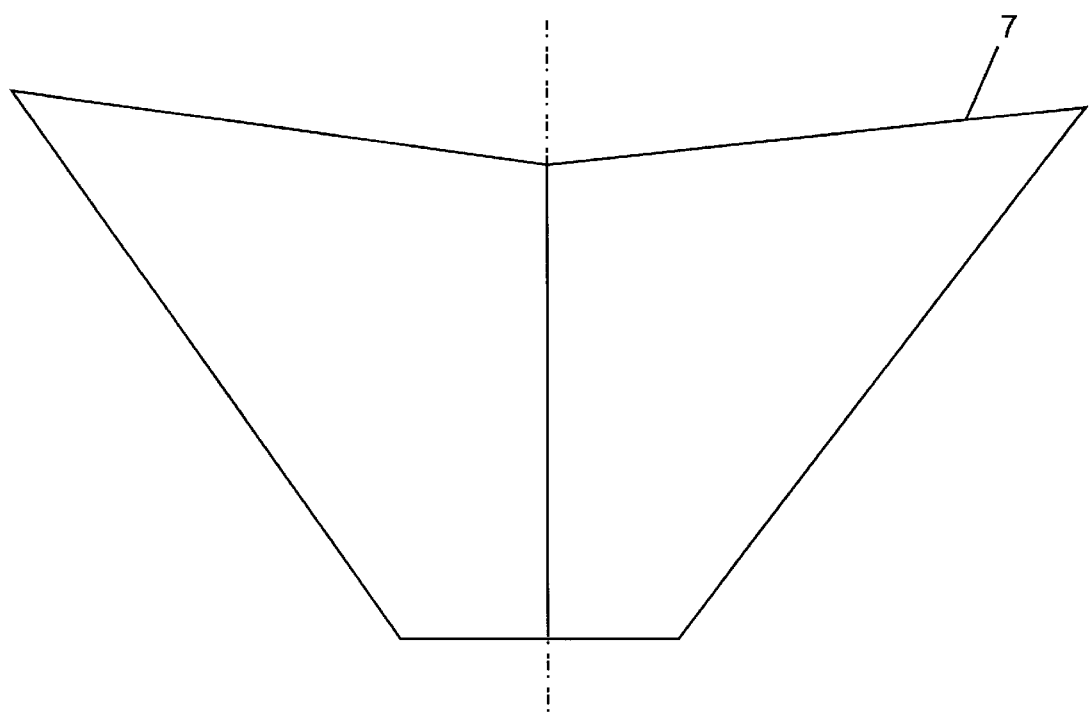
FIG. 10 illustrates a side view of the airbag as folded in FIG. 8.
Figure 11:
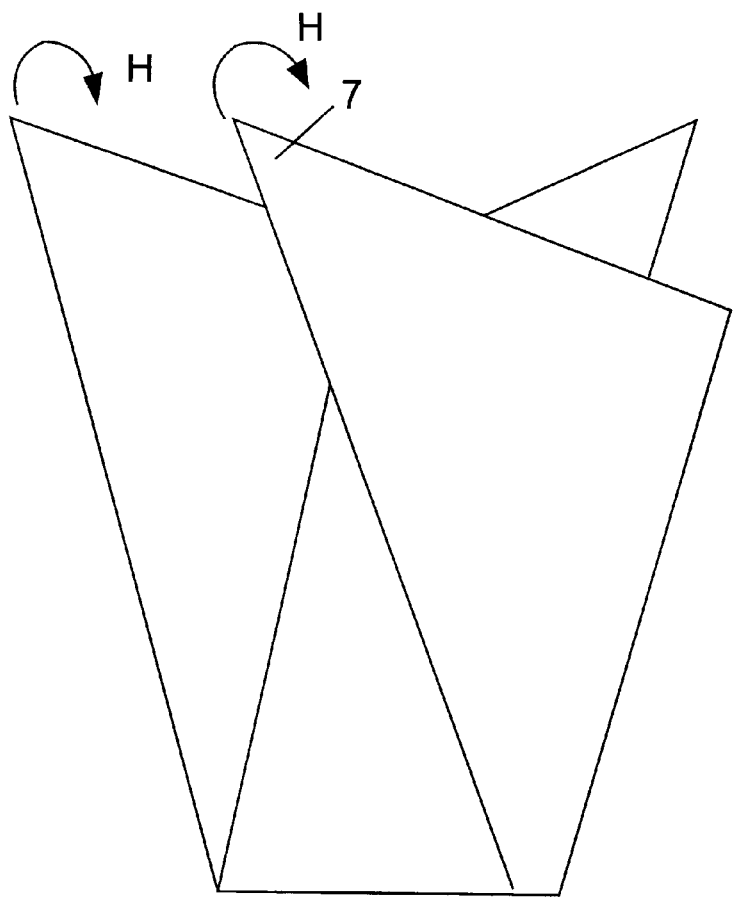
FIG. 11 is a side view of the airbag as folded in FIG. 9.
Figure 12:
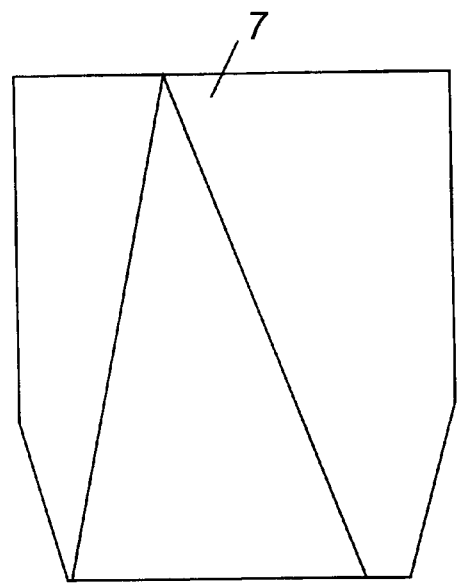
FIG. 12 is a side view of the fully folded airbag according to the method of the invention.

The sides of the folded airbag are then brought to and towards each other at the centre of the square. This is shown by the arrows D in FIG. 7. The centres of the sides of the square all come together generally above the centre of the square as shown in FIG. 8. This causes the corners to stick out more prominently and form upstanding ears 7 as shown in FIG. 8 and in side view in FIG. 10. These corner ears 7 are then pulled radially outward in directions F (FIG. 9) and bent over or turned circumferentially in the direction of arrows E in FIG. 9 and FIG. 11 so that the ears 7 are flattened against the sides of the polygon. The ears are then each rolled and if necessary the upper corner is tucked in to form the particularly compact folded shape for the airbag illustrated in FIG. 12.

Figure 9:
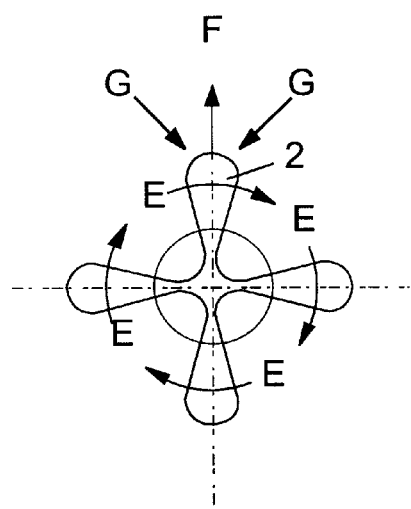

An improvement is further produced if pressure is applied to the lobes of the protruding corner ears 7, as indicated by arrows G in FIG. 9. This flattens the corner ears and further compacts the folded airbag. This step could replace or compliment the corner stretching step (F, FIG. 9).

What is claimed is:

1. A method of folding an airbag for insertion in an airbag housing in a vehicle comprising the steps of:

laying the airbag generally flat;

making folds in the flat airbag to form a polygon in plan view, the polygon having a geometric centre, a plurality of corners and a plurality of sides, the plurality of corners being equal to the plurality of sides, the method further comprising:

folding each of the plurality of sides of the polygon upwardly and inwardly of the polygon considered in plan view so at least one point on each of the plurality of sides meets a point on at least one other of the plurality of sides at a position generally above the centre of the polygon so that each of the plurality of corners of the polygon form a respective upstanding corner ear, and subsequently:

rolling the upstanding corner ears of the polygon to flatten them against the sides of the polygon and to form the airbag into a cylindrical shape.

2. A method according to claim 1 wherein the polygon is a regular polygon.

3. A method according to claim 2 wherein the polygon is a square.

4. A method of folding an airbag according to claim 1, wherein the step of making folds in the flat airbag comprises folding the airbag along parallel lines spaced equidistantly on opposite sides of a first line of symmetry of the airbag and subsequently folding the airbag along parallel lines spaced equidistantly on opposite sides of a second line of symmetry of the airbag, the second line being perpendicular to the first line of symmetry.

5. A method according to claim 4 wherein the first and second lines of symmetry are centre lines of the flat airbag in plan view.

6. A method according to claim 5, wherein the step of making folds is repeated.

7. A method according to claim 1, wherein the corner turning step is accompanied or preceded by a step of stretching the corner ears in a radially outward direction, and/or of flattening the corner ears by applying force at opposite sides of each ear.

8. A method of folding an airbag housing in a vehicle comprising the steps of:

laying the airbag generally flat;

making folds in the flat airbag to form a polygon in plan view, the polygon having a geometric centre, a plurality of corners and a plurality of sides, the method further comprising:

folding each side of the polygon upwardly and inwardly of the polygon considered in plan view so that at least one point on each side meets a point on at least one other side at a position generally above the centre of the polygon so that each corner of the polygon forms a respective upstanding corner ear, rolling each upstanding corner ear to flatten them against the sides of the polygon and to form the airbag into a cylindrical shape, and stretching the corner ears in a radially outward direction.

9. A method according to claim 8 wherein the step of stretching the corner ears accompanies the step of rolling the corner ears.

10. A method according to claim 8 wherein the step of stretching the corner ears is preceded by the step of rolling the corner ears.

11. A method according to claim 8 further comprising the step of flattening the corner ears by applying force at opposite sides of each ear.

* * * * *